Patented June 27, 1933

1,915,891

UNITED STATES PATENT OFFICE

HANS KÄGI, OF BASEL, SWITZERLAND, ASSIGNOR TO SOCIETY OF CHEMICAL INDUSTRY IN BASLE, OF BASEL, SWITZERLAND

DISPERSE SYSTEM AND PROCESS OF MAKING SAME

No Drawing. Application filed March 14, 1931, Serial No. 522,773, and in Switzerland March 22, 1930.

The present invention relates to the manufacture of disperse systems. It comprises the process of making these systems, the disperse systems themselves as well as the application of these systems for the improvement of textiles, and the textiles improved with aid of these systems.

It is known that for the manufacture of disperse systems the salts of partially acylated polyamines are used with advantage as emulsifying agents, it being indifferent whether the non-acylated amino groups of the polyamine are present in the form of a primary, secondary or tertiary base or in the form of a quaternary ammonium compound. Such partially acylated polyamines are inter alia disclosed in the U. S. Patents 1,534,525 and 1,737,458. Other partially acylated polyamines are for example such which derive from diamines containing OH-groups, for example the oleyl-β-hydroxy-γ-diethyl-amino-propyl-amide and the ammonium compounds thereof, as also such which derive from cyclic diamines, such as the stearyl-para-amino-dimethyl-aniline and the ammonium compounds deriving therefrom, such as the addition product of dimethyl-sulfate to the above compound, the 4-oleyl-amino-(diethyl-amino-ethyl-methyl)-aniline of the formula:—

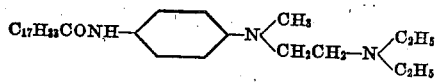

mono-acyl-piperazine, further basic urethanes, such as, for example, the dimethyl-ester of the diethyl-amino-ethyl-imino-dicarboxylic acid and the dimethylsulfate addition product thereof, and the like. Such acylated polyamines may further be produced by partially acylating compounds, such as diethylene-triamine, triethylenetetramine,

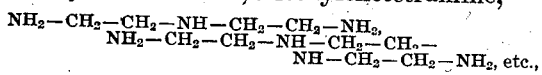

and other similar compounds, and their alkylation or aralkylation products, or the ammonium compounds thereof. Among these products those are particularly valuable which derive from high molecular acids. among these there may be mentioned palmitinic acid, stearic acid, and oleic acid, lauric acid, the naphthenic acids, abietic acid, and the like.

If with the aid of these compounds lipoid-soluble substances, such as oils, fats, waxes, hydrocarbons (solid or liquid, particularly of higher molecular weight with more than 14 carbon atoms), terpenes, and the like, are to be emulsified with water, the success is not always satisfactory.

The surprising observation has now been made that essentially better results are obtained if the emulsification of the said substances with solutions of the salts of partially acylated polyamines is carried out in presence of at least one further protective colloid. Such protective colloids are, for example, soaps, gall acids and their derivatives, sulfonic acids of high molecular acids and their salts, sulfite cellulose waste liquors, Turkey red oil, albumin, gelatin, glue, saponin, natural and artificial resins, derivatives of cholesterine, phosfatides, gelloses, gum, natural and artificial waxes, wool waxes, solvents and softening agents, organic bases and their salts, inorganic colloids, and the like. In the case of oils, fats and waxes which contain free fatty acids, the production of the further protective colloid may be carried out with addition of small quantities of an organic or inorganic base, so that formation of a water-soluble soap takes place, which plays the part of the protective colloid. The aqueous solutions thus produced, which are characterized by the presence of a lipoid-soluble substance, of a salt of a partially acylated polyamine, and of a further protective colloid, are of a great technical importance for a variety of purposes. They are particularly very valuable in the textile industry for water-proofing textiles, the production of sizings and softeners, etc.

The following examples describe the production of such emulsions.

Example 1

100 parts of oleyl-diethyl-ethylene-diamine hydrochloride are dissolved in 1000 parts of water. There are added 2.5 parts of sodium hydroxide dissolved in some water and then 1000 parts of olive oil, while stirring vigorously. There is obtained a stable, milky emulsion.

*Example 2*

250 parts of tetraline are mixed with 250 parts of a solution of oleyl-diethyl-ethylene-diamine hydrochloride of 10 per cent. strength. In this case only a coarse dispersion is produced. After addition of 10 parts of a sodium oleate solution of 15 per cent. strength and agitation there is obtained a fine, highly dispersed emulsion.

*Example 3*

20 parts of the sulfate of the conversion product of castor oil with the theoretical quantity of unsymmetrical diethyl-ethylene-diamine, calculated on the saponification number, are dissolved in 1000 parts of water. After addition of 60 parts of a solution of 10 per cent. strength of an alkali salt of the di-isopropyl-naphthalene-sulfonic acid, the whole is vigorously shaken with 500 parts of chloro-benzene. An emulsion is thus obtained which is considerably finer and more stable than the emulsion which has been made with a 2 per cent. solution of the above sulfate, or a 2 per cent. solution of the salt of the di-isopropyl-naphthalene-sulfonic acid alone.

*Example 4*

Petroleum, in which 4 per cent. of lanolin have been dissolved, is emulsified with an aqueous solution of 5 per cent. strength of the oleyl-diethyl-ethylene-diamine hydrochloride. An emulsion is thus obtained which is very much finer and more stable than without addition of lanolin.

*Example 5*

Paraffin is melted and stirred until cold with an aqueous solution of 5 per cent. strength of the oleyl-diethyl-ethylene-diamine citrate. There is thus obtained a suspension of small paraffin pellets. However, if 4 per cent. of gelatin is previously added to the citrate solution, a salve-like fine emulsion of paraffin is obtained.

*Example 6*

450 parts of paraffin oil, 50 parts of lanolin and 20 parts of oleyl-aminoethyl-diethyl-benzyl-ammonium chloride are heated together. At about 75° C. there are run in, while stirring well, 480 parts of sodium oleate solution containing 28.2 parts of oleic acid and 4 parts of sodium hydroxide. After cooling, a thick colloidal solution of paraffin oil is obtained which can be freely diluted with water.

*Example 7*

200 parts of turpentine oil and 100 parts of a solution of oleylamino-ethyl-diethyl-methyl-ammonium-methylsulfonate of 10 per cent. strength, are mixed together and, while agitating vigorously, there are added in doses 28 parts of 0.5 N-solution of sodium abietinate. There is thus obtained a colloidal solution of turpentine.

*Example 8*

1000 parts of a solution of oleylamino-ethyl-diethyl-methyl-ammonium-methylsulfonate of 10 per cent. strength are diluted with 500 parts of water in which are dissolved 3.2 parts of sodium hydroxide. 1500 parts of boiled linseed oil are added and by shaking there is obtained a stable, finely dispersed linseed oil emulsion.

*Example 9*

900 parts of paraffin wax are melted and 100 parts of beeswax and 40 parts of oleyl-amino-ethyl-diethyl-benzyl-ammonium-chloride are stirred into the fused mass. To this mixture, heated at a temperature above the melting point of the paraffin there is run in, while stirring well, a solution of 95 parts of oleic acid and 12.8 parts of sodium hydroxide in 850 parts of water. The emulsion thus produced is stirred until cold. There is obtained a thick liquid which dissolves in water to form a highly colloidal suspension of paraffin wax.

In this example there may be used instead of the whole or a part of the paraffin wax, a similar body or an oil, such as paraffin oil, or other mineral oil.

The application of the new emulsions for the improvement of textile materials is illustrated in the following examples:—

*Example 10*

Cotton satin is impregnated as follows:—
The material is padded in a solution of 2 kilos of the emulsion prepared according to the particulars given in the first paragraph of Example 9 in 100 parts of water of ordinary temperature, dried on a stretching frame, moistened and calendered under pressure. The material thus finished is characterized by its beautiful lustre.

*Example 11*

A solution is prepared from 9 kilos soluble starch, 5 kilos glucose sirup, 3 kilos of the emulsion prepared according to the particulars of the 1st paragraph of Example 9, and 1 kilo of soap in 100 litres water. This finish serves for the finishing of canvas for mattresses which is then distinguished by a solid linen-like feel. In this example as well as in the preceding example, the emulsion of the first paragraph of Example 9 may partly be replaced by the emulsions mentioned in the second paragraph of Example 9.

Example 12

Artificial silk is finished as follows:—

3 kilos of the emulsion prepared according to the particulars of Example 1 are added to 100 litres of water and the material is impregnated with this solution once or twice, whereupon it is hydro-extracted and dried. The artificial silk is distinguished by a fine feel.

Example 13

Rain coat cloth is waterproofed by impregnation with the following solution in the single-bath process:—

100 parts of water are mixed with a solution of 200 grams Marseilles soap, to which with good stirring 500 grams of the emulsion obtained according to the particulars of the first paragraph of Example 9 are added. 3 litres of acetate of alumina of 6° Bé. are then added, while vigorously stirring, whereupon the impregnation operation is commenced. This latter operation is preferably conducted on the padding machine, and the goods, without washing, are then subjected to the drying process. The quality of being waterproof of the material impregnated in this manner is better than in the case of the material treated according to the usual two-bath process with soap and acetate of alumina.

Example 14

For the sizing of artificial silk 400 grams of potato-starch are made into a paste with 50 litres of water, to which 50 litres cold water and 300 grams of the emulsion prepared according to the particulars of the first paragraph of Example 9 are added. The material is impregnated as usual with the sizing mass, hydro-extracted and dried. The artificial silk sized in this manner is distinguished by its smooth surface which is of great advantage for its subsequent working-up in the weaving or knitting mills.

What I claim is:—

1. A process for the production of disperse systems from lipoid-soluble substances and water, consisting in emulsifying lipoid-soluble substances with aid of salts of partially acylated polyamines, in presence of soaps and waxes as protective colloids, with water.

2. A process for the production of disperse systems from lipoid-soluble substances and water, consisting in emulsifying lipoid-soluble substances with aid of salts of polyamines partially acylated with high molecular acids, in presence of soaps and waxes as protective colloids, with water.

3. A process for the production of disperse systems from lipoid-soluble substances and water, consisting in emulsifying lipoid-soluble substances with aid of salts of polyamines partially acylated with high molecular fatty acids, in presence of soaps and waxes as protective colloids, with water.

4. A process for the production of disperse systems from lipoid-soluble substances and water, consisting in emulsifying lipoid-soluble substances with aid of salts of aliphatic diamines partially acylated with high molecular fatty acids, in presence of soaps and waxes as protective colloids, with water.

5. A process for the production of disperse systems from lipoid-soluble substances and water, consisting in emulsifying lipoid-soluble substances with aid of salts of unsymmetrically alkylated diamines partially acylated with high molecular fatty acids containing 15 to 17 carbon atoms, in presence of soaps and waxes as protective colloids, with water.

6. A process for the production of disperse systems from lipoid-soluble substances and water, consisting in emulsifying lipoid-soluble substances with aid of salts of unsymmetrical diethylethylenediamine partially acylated with high molecular fatty acids containing 15 to 17 carbon atoms, in presence of soaps and waxes as protective colloids, with water.

7. A process for the production of disperse systems from hydrocarbons containing more than 15 carbon atoms and water, consisting in emulsifying these hydrocarbons with aid of salts of unsymmetrical diethylethylenediamine partially acylated with high molecular fatty acids containing 15 to 17 carbon atoms, in presence of soaps and waxes as protective colloids, with water.

8. A process for the production of disperse systems from paraffin and water, consisting in emulsifying paraffin with aid of the addition product of benzyl chlorine and oleyl-diethylethylenediamine, in presence of sodium oleate and wax, with water.

9. As new products the disperse systems consisting of water, lipoid-soluble substances, salts of partially acylated polyamines, and soaps and waxes as protective colloids.

10. As new products the disperse systems consisting of water, lipoid-soluble substances, salts of polyamines partially acylated with high molecular acids, and soaps and waxes as protective colloids.

11. As new products the disperse systems consisting of water, lipoid-soluble substances, salts of polyamines partially acylated with high molecular fatty acids, and soaps and waxes as protective colloids.

12. As new products the disperse systems consisting of water, lipoid-soluble substances, salts of aliphatic diamines partially acylated with high molecular fatty acids and soaps and waxes as protective colloids.

13. As new products the disperse systems consisting of water, lipoid-soluble substances, salts of unsymmetrically alkylated diamines partially acylated with high molecular fatty acids containing 15 to 17 carbon atoms, and soaps and waxes as protective colloids.

14. As new products the disperse systems consisting of water, lipoid-soluble substances, salts of unsymmetrical diethylethylenediamine partially acylated with high molecular fatty acids containing 15 to 17 carbon atoms, and soaps and waxes as protective colloids.

15. As new products the disperse systems consisting of water, hydrocarbons containing more than 15 carbon atoms, salts of unsymmetrical diethylethylenediamine partially acylated with high molecular fatty acids containing 15 to 17 carbon atoms, and soaps and waxes as protective colloids.

16. As new products the disperse systems consisting of water, hydrocarbons containing more than 15 carbon atoms, the addition product of benzyl chloride and oleyl-diethylethylenediamine, soaps and waxes.

17. As new products the disperse systems consisting of water, paraffin, the addition product of benzyl chloride and oleyl-diethylethylenediamine, sodium oleate and wax.

In witness whereof I have hereunto signed my name this 3rd day of March 1931.

HANS KÄGI.